US009978375B2

(12) United States Patent
Penke

(10) Patent No.: US 9,978,375 B2
(45) Date of Patent: May 22, 2018

(54) METHOD FOR TRANSMITTING PHONETIC DATA

(71) Applicant: Samsung Electronics Co., Ltd., Suwon-si, Gyeonggi-do (KR)

(72) Inventor: Siva Penke, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/185,198

(22) Filed: Feb. 20, 2014

(65) Prior Publication Data

US 2015/0235638 A1 Aug. 20, 2015

(51) Int. Cl.

*G10L 15/00* (2013.01)
*G10L 19/00* (2013.01)
*G10L 15/02* (2006.01)

(52) U.S. Cl.

CPC .... *G10L 19/0018* (2013.01); *G10L 2015/025* (2013.01)

(58) Field of Classification Search

CPC ...................... G10L 19/0018; G10L 2015/025
See application file for complete search history.

(56) References Cited

U.S. PATENT DOCUMENTS 8,768,704 B1 * 7/2014 Fructuoso ............ G10L 13/086 704/2
2005/0197837 A1 * 9/2005 Suontausta ........... G10L 15/005 704/260
2006/0095265 A1 * 5/2006 Chu ...................... G10L 13/033 704/268
2006/0149457 A1 * 7/2006 Ross ....................... G10L 15/30 701/117
2007/0033005 A1 * 2/2007 Cristo ................... G06F 17/279 704/9
2007/0192440 A1 * 8/2007 Ramanathan ..... G06F 17/30607 709/219
2011/0066437 A1 * 3/2011 Luff ....................... G06Q 30/02 704/254
2013/0210343 A1 * 8/2013 Wu ....................... H04W 4/008 455/41.1

* cited by examiner

*Primary Examiner* — Qian Yang
(74) *Attorney, Agent, or Firm* — Jefferson IP Law, LLP

(57) ABSTRACT

A method for transmitting and receiving a communication is provided. The method of receiving a communication includes detecting a selection of a phonetic function which requests or causes inclusion of at least one phonetic data file in the communication, and receiving, in the communication, the one or more phonetic data file.

20 Claims, 8 Drawing Sheets

METHOD FOR TRANSMITTING PHONETIC DATA

TECHNICAL FIELD

The present disclosure relates to an apparatus and method for injecting voice spelling alphabets. More particularly, the present disclosure relates to an apparatus and method for generating and storing a data file for phonetic pronunciation of an identifier and including the data file in a communication.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

At present, there exists a method of providing caller identification information to a called party that is in spoken form based on a text-to-speech pronunciation of the calling party's identity. There also exists a method whereby a caller creates and edits a phonetic-alphabet representation of its identity. In this case, the phonetic representation is conveyed to the called party as caller identification information (caller ID). The phonetic representation of the caller's identity is displayed to the called party, is converted to speech, and/or is converted to characters of an alphabet of a language of the second party and then displayed thereto.

Nonetheless, a need remains for an apparatus and method for providing an improved method of requesting, generating and communicating a data file for a phonetic pronunciation of an identifier.

SUMMARY

Aspects of the present disclosure are to address at least the above-mentioned problems and/or disadvantages and to provide at least the advantages described below. Accordingly, an aspect of the present disclosure is to provide an apparatus and method for generating and storing a data file for phonetic pronunciation of an identifier and including the data file in a communication.

In accordance with an aspect of the present disclosure, a method for receiving a communication is provided. The method includes detecting a selection of a phonetic function which requests or causes inclusion of at least one phonetic data file in the communication, and receiving, in the communication, the one or more phonetic data file.

In accordance with another aspect of the present disclosure, an apparatus for transmitting a communication is provided. The apparatus includes programming a mobile device with phonetic data, creating one or more audio or image files including the phonetic data, and transmitting, in a communication, the one or more audio or image files to be played or displayed upon reception of the communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
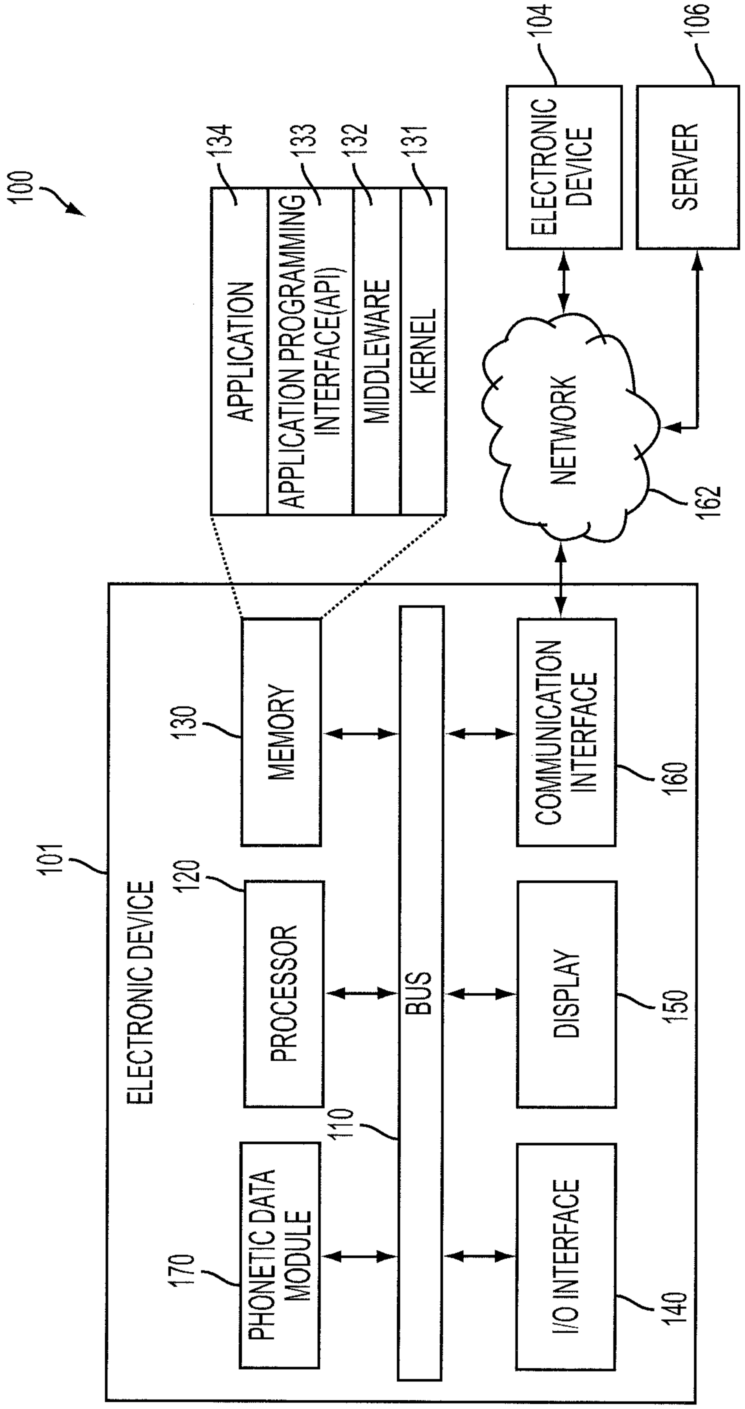
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, an electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for generating a file programmed with phonetic data to be transferred in a communication.

For example, an entity controlling one electronic device may desire to communicate with an entity controlling another electronic device. To aid in this communication, the entity wishing to transmit the message (i.e., a sending or transmitting party or device) may desire to send data files or executable files which aid the receiving entity (i.e., or receiving party or device) in properly pronouncing an identity of, or an identifier related to, the transmitting entity. Such files may be alternatively referred to herein as “phonetic files” or “phonetic data files.” Such files may include a phonetic alphabetic system, such as the International Phonetic Alphabet (IPA) devised by the International Phonetic Association, or any other phonetic system (e.g., the NATO phonetic alphabet), optionally including any extensions thereof, having a standardized representation of the sounds of oral language. Likewise, the files may include any other standard or customized phonetic system or data, such as in the case of a user-designated system, e.g., a system in which a user has designated “A” as in “Africa” rather than “A” as in “alpha,” or the like. Additionally, the files may include components of a system of phonetic transcription (i.e., the transcribing of sounds) using a standardized set of symbols for the sounds corresponding to the identity of, or the identifier related to, the transmitting entity. The phonetic files may be stored in a device memory or may be accessed over a communications network, and may include prerecorded audio or image files.

In embodiments, the identity of, or the identifier associated with a device or party, is not limited herein, and may include a first and/or a last name, an email address, a home address, a phone number, a serial number, a device model number, and so on.

In embodiments, the transferred files may include files (e.g., portable audio or video files) in one or more file formats, and may optionally include one or more executable files. For example, the files may include audio files programmed according to a desired pronunciation of an identity of an entity according to one or more phonetic alphabets (e.g., the IPA and/or the NATO phonetic alphabet). That is, e.g., if a caller named Bryce Nyle makes a call, the transmitted files may include an audio file which, when played back, says “B as in Bravo,” “R as in Romeo,” “Y as in Yankee,” “C as in Charlie,” “E as in Echo,” “N as in November,” “Y as in Yankee,” “L as in Lima,” “E as in Echo.” Alternatively, a system which distinguishes among more than one potential sound for a particular letter may be used. In the above case, such a system could, e.g., indicate upon playback that the sound of the letter “Y” is like the sound of the letter “I” in the word “India,” that the sound of the letter “C” is like the sound of the letter “S” in the word “Sierra,” and so forth.

The programming of the transmitted files is not limited herein, and may take place in various ways. For example, programmed files may be pre-loaded on a device during manufacturing, or programming may be done by an entity at a time of device set-up or may occur in a user environment prior to, during or after a voice or an electronic communication. Programming may occur when a device enters into a programming mode and when, e.g., a user designates an identifier to which phonetic data is to be applied. As in the above example, if a device user named Bryce Nyle designates his name as the identifier, then the device will be programmed to be capable of storing and transmitting phonetic data files indicating the phonetic spelling thereof (i.e., “B as in Bravo,” “R as in Romeo,” “Y as in Yankee,” “C as in Charlie,” “E as in Echo,” “N as in November,” “Y as in Yankee,” “L as in Lima,” “E as in Echo”). Likewise, the device may be programmed to include a system which distinguishes among more than one potential sound for a particular letter. In the above case, such a system could, e.g., indicate upon playback that the sound of the letter “Y” is like the sound of the letter "I" in the word "India," that the sound of the letter "C" is like the sound of the letter "S" in the word "Sierra," and so forth.

In embodiments, the manner of file generation, storage and attachment to a communication are not limited. For example, phonetic data may be generated using external or other software on a Personal Computer (PC), a notebook computer, a handheld computer or any other portable computing device, including a smart phone. Additionally, the generation and storage of a file may occur prior to, or concurrent with, a communication. That is, generated files may be stored in advance in a secure or non-secure, volatile or non-volatile memory, based on vendor design, or may be generated and stored at the time of communication. For example, file generation and storage may occur at the time of a device set-up procedure. Likewise, a desired data file may be attached to a communication in advance of the communication based on a device or user setting, may be attached at the time of communication based on a real-time user command (e.g., during an initiation of a voice communication or in the middle of a voice communication), may be attached after the communication, or the like.

In embodiments, the type of communication is not limited and may include any one of a voice communication, a video communication, a video call communication and an electronic mail (e-mail) communication.

A receiving party or device may request phonetic data from a transmitting party. Such a request is not limited herein. For example, a global setting may be applied to a receiving device which automatically requests incoming communications to include phonetic data in connection with all, or a subset of, transmitting entities. Likewise, a receiving party may request phonetic data in a communication from a transmitting party upon initial receipt of a communication, during a communication, or after a communication. For example, a customer service representative in a call center may request the spelling of a caller's name during a phone call.

Once the receiving entity receives the communication including phonetic data on the receiving device, the phonetic files may be saved, and may be parsed and played or displayed. For example, in the case of an audio file, the phonetic data may take the form of a small .mp3 file, which may be opened and played back on the receiving device using any one of a number of well-known applications. Similarly, in the case of phonetic transcription, the phonetic data may take the form of a small image file (e.g., a GIF or PNG file), which may be opened and displayed on the receiving device using any one of a number of well-known applications. The phonetic files may parsed and played or displayed prior to the commencement of the communication, during the communication or after the communication. Optionally, the phonetic files may also be saved to a device or other memory, and may, e.g., be incorporated into contact list information or other information related to the transmitting entity and may later be played back or displayed.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a phonetic data module 170, and/or the like.

The bus 110 may be circuitry that connects the foregoing components and allows communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the phonetic data module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the phonetic data module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and the like.

The I/O interface 140 may, for example, receive instruction and/or data from a user. The I/O interface 140 may send the instruction and/or the data, via the bus 110, to the processor 120, the memory 130, the communication interface 160, the phonetic data module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the phonetic data module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/the like.

Figure 2:
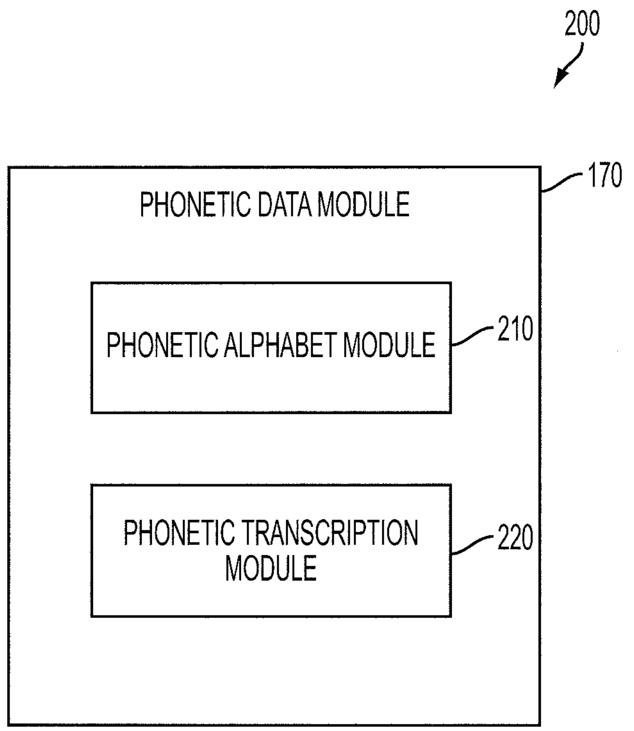
FIG. 2 illustrates a block diagram of a phonetic data module according to various embodiments of the present disclosure.

The phonetic data module 170 may, for example, process at least a part of information received from other components (e.g., the processor 120, the memory 130, the I/O interface 140, the communication interface 160, and/or the like), and provide various information, services, and/or the like to the user in various manners. For example, the phonetic data module 170 may control via the processor 120 or independently at least some of the functions of the electronic device 101 to communicate or connect to another electronic device (e.g., the electronic device 104, the server 106, and/or the like). FIG. 2 will provide additional information regarding the phonetic data module 170.

FIG. 2 illustrates a block diagram of a phonetic data module according to various embodiments of the present disclosure.

Referring to FIG. 2, phonetic data module 170 may include a phonetic alphabet module 210, a phonetic transcription module 220, and/or the like.

The phonetic alphabet module 210 may be configured to, for example, associate a stored phonetic character, symbol or number with a designated character of an identifier. For example, during programming of phonetic data (as discussed above and below), a user may wish to designate an identifier (e.g., an identity of the user, a phone number, or the like). The characters of the identifier may be associated with the corresponding characters, symbols, numbers and other corresponding information stored in a phonetic database (e.g., any relevant phonetic system). An audio file including the pronunciation of the phonetic characters corresponding to the characters of the identifier may then be generated by the phonetic alphabet module 210, may be stored in memory, and may be transmitted in a communication.

Phonetic transcription module 220 may be configured to, for example, associate a stored phonetic character with a designated character of an identifier or with the sounds of the audio file generated by the phonetic alphabet module 210.

For example, during programming of phonetic data (as discussed above and below), a user may wish to designate an identifier (e.g., an identity of the user, a phone number, or the like). The characters of the identifier may be associated with the corresponding characters, symbols, numbers and other corresponding information stored in a phonetic database (e.g., any relevant phonetic system). An image file including the phonetic data corresponding to the characters of the identifier may then be generated by the phonetic transcription module 220, may be stored in memory, and may be transmitted in a communication.

Files generated by phonetic alphabet module 210 and the phonetic transcription module 220 are not limited herein, and may include a single audio or image file containing a series of phonetic symbols corresponding to an identifier. Likewise, the files may include multiple audio or image files, one for each character of the identifier.

Figure 3:
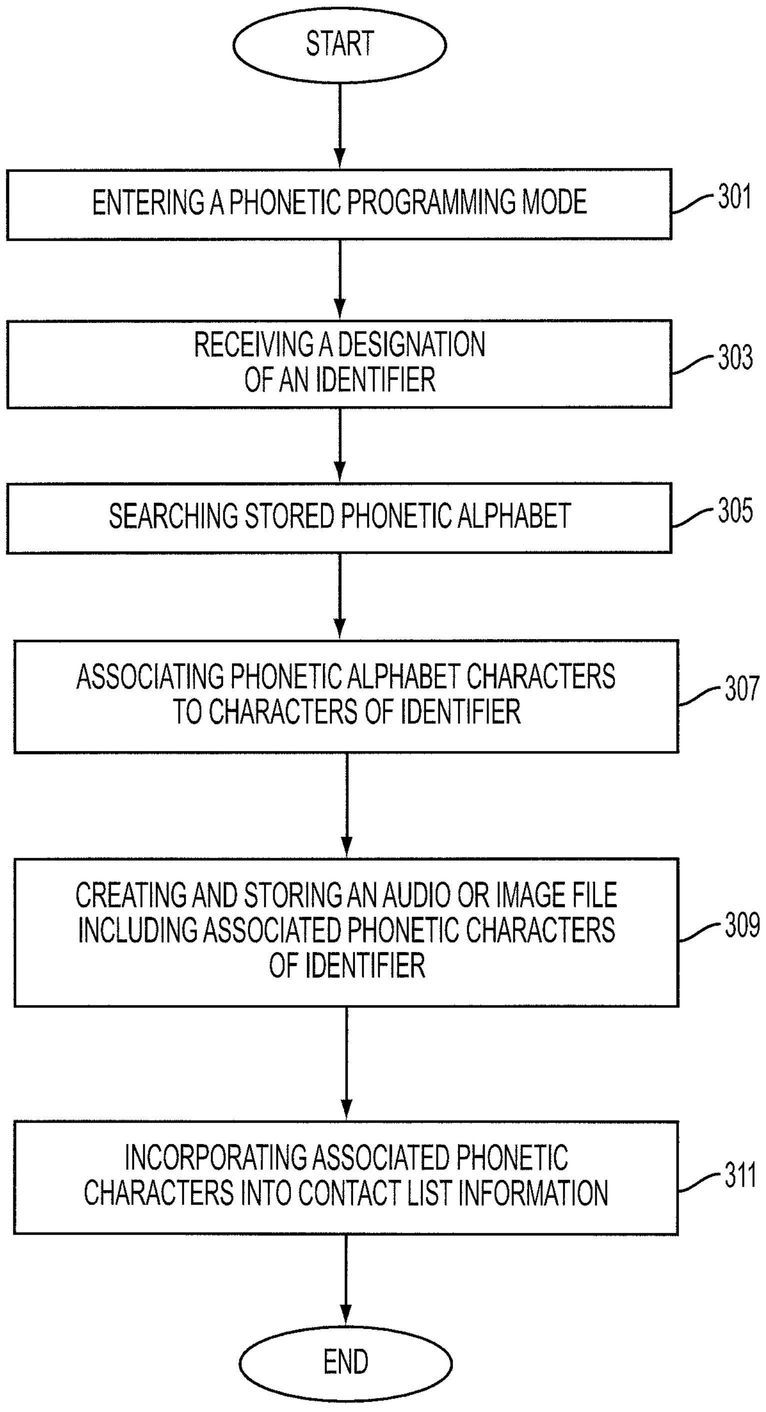
FIG. 3 illustrates a method of programming phonetic data according to various embodiments of the present disclosure.

FIG. 3 illustrates a method of programming phonetic data according to various embodiments of the present disclosure.

Referring to FIG. 3, an electronic device enters into a phonetic programming mode in operation 301. Phonetic programming mode may be entered at device set-up, or may occur at some later time, such as prior to, during or after a communication. In operation 303, the electronic device receives a designation of an identifier. For example, the user of the device may designate his or her name, email address, phone number, or the like, as the identifier. In operation 305, a stored phonetic alphabet is searched based on the designated identifier. In operation 307, phonetic alphabet characters are associated with the characters of the identifier. In operation 309, an audio and/or an image file is created and stored in device memory which includes the associated phonetic characters of the identifier. In alternative embodiments, several individual phonetic files (e.g., audio or image files for individual characters) may instead be, or may initially be, created and stored in device memory. Such individual files may be created and stored in individual form, or may be combined into a larger file. In operation 311, the associated phonetic characters of the identifier are incorporated into contact list information.

Figure 4:
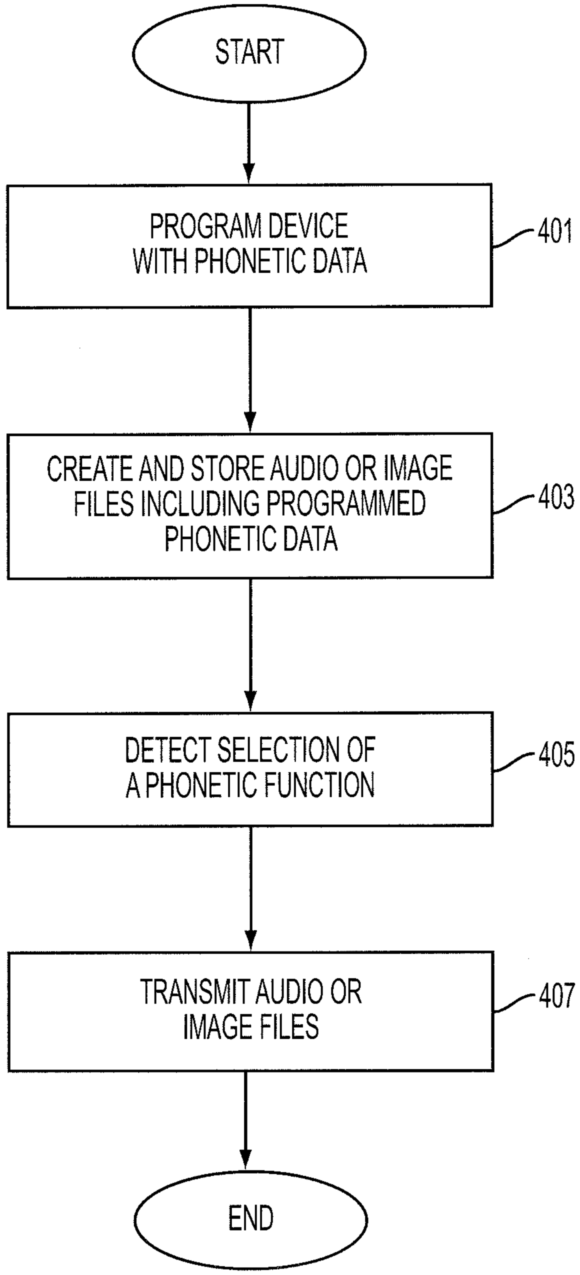
FIG. 4 illustrates a method of transmitting phonetic data according to various embodiments of the present disclosure.

FIG. 4 illustrates a method of transmitting phonetic data according to various embodiments of the present disclosure.

Referring to FIG. 4, a user programs the electronic device with phonetic data in operation 401. In operation 403, an audio and/or an image file is created and stored in device memory which includes the programmed phonetic data. In alternative embodiments, several individual phonetic files (e.g., audio or image files for individual characters) may instead be, or may initially be, created and stored in device memory. Such individual files may be created and stored in individual form, or may be combined into a larger file. In operation 405, a selection of a phonetic function is detected. This phonetic function may be, e.g., a selection of a key or function on a mobile device, and may occur by a transmitting entity or a receiving entity. In operation 407, the created and stored audio and/or image file is transmitted. In alternative embodiments, several individual phonetic files may be sent.

Figure 5:
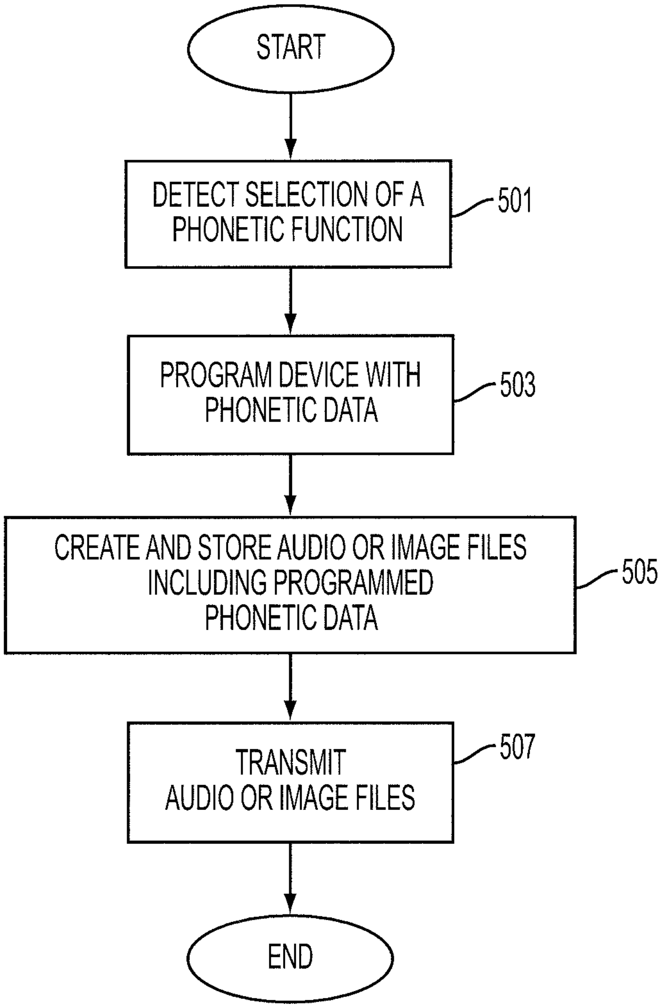
FIG. 5 illustrates another method of transmitting phonetic data according to various embodiments of the present disclosure.

FIG. 5 illustrates another method of transmitting phonetic data according to various embodiments of the present disclosure.

Referring to FIG. 5, a selection of a phonetic function is detected in operation 501. This phonetic function may be, e.g., a selection of a key or function on the transmitting mobile device. In operation 503, a user programs the electronic device with phonetic data. In operation 505, an audio and/or an image file is created and stored in device memory which includes the programmed phonetic data. Alternatively, in embodiments, several individual phonetic files (e.g., audio or image files for individual characters) may instead be, or may initially be, created and stored in device memory. Such individual files may be created and stored in individual form, or may be combined into a larger file. In operation 507, the created and stored audio and/or image file is transmitted. In alternative embodiments, several individual phonetic files may be sent.

Figure 6:
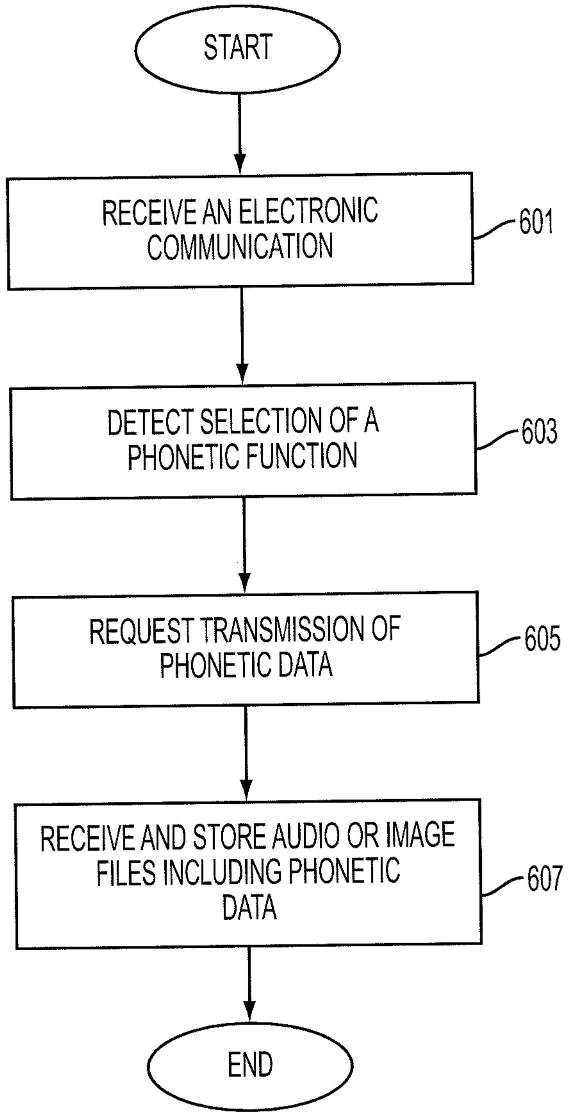
FIG. 6 illustrates a method of receiving phonetic data according to various embodiments of the present disclosure.

FIG. 6 illustrates a method of receiving phonetic data according to various embodiments of the present disclosure.

Referring to FIG. 6, an electronic communication is received in operation 601. In operation 603, a selection of a phonetic function is detected. This phonetic function may be, e.g., a selection of a key or function on the device receiving a communication. In operation 605, a request for transmission of phonetic data is sent to a transmitting entity of the electronic communication. In operation 607, one or more audio and/or image files including the phonetic data are received and stored in the receiving device.

Figure 7:
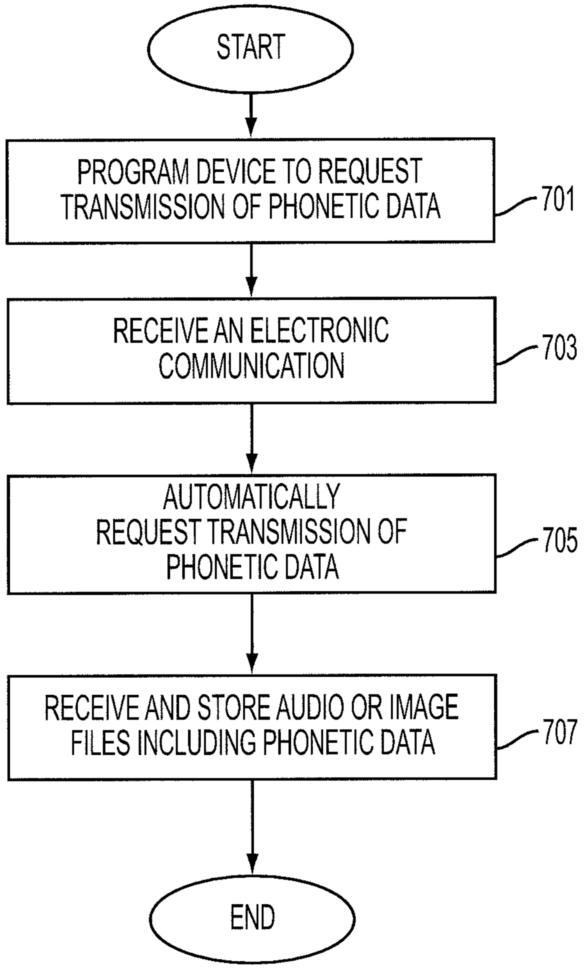
FIG. 7 illustrates another method of receiving phonetic data according to various embodiments of the present disclosure.

FIG. 7 illustrates another method of receiving phonetic data according to various embodiments of the present disclosure.

Referring to FIG. 7, a device is programmed to request transmission of phonetic data in all of, or a subset of all of, incoming communications in operation 701. In operation 703, an electronic communication is received. In operation 705, the receiving device automatically requests transmission of phonetic data from the transmitting entity based on the programming in operation 701. In operation 707, one or more audio and/or image files including the phonetic data are received and stored in the receiving device.

Figure 8:
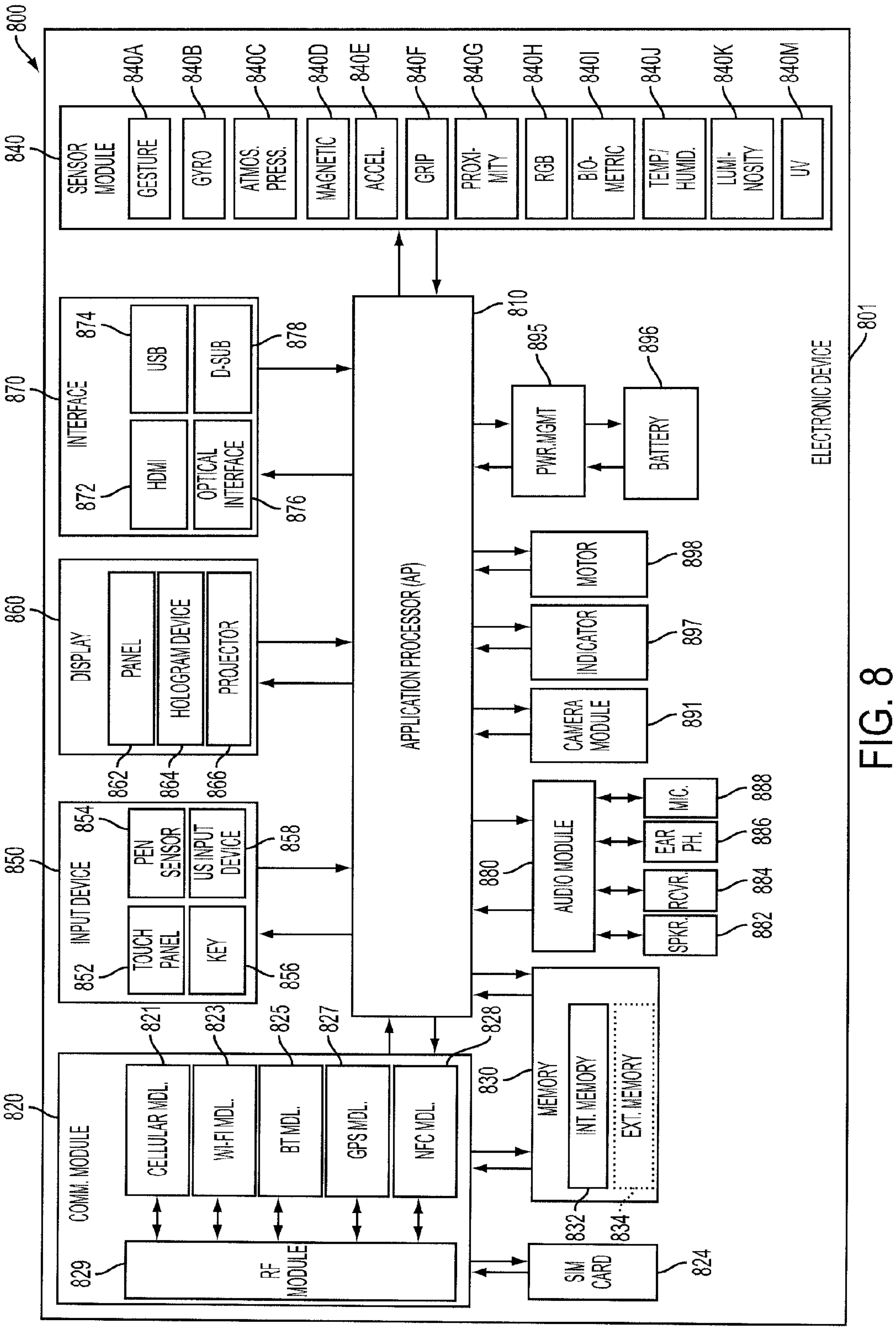
FIG. 8 illustrates a block diagram of hardware according to various embodiments of the present disclosure.

FIG. 8 illustrates a block diagram of hardware according to various embodiments of the present disclosure.

Referring to FIG. 8, the hardware 801 may be, for example, a part or all of the electronic device 101. Referring to FIG. 8, the hardware 801 may include one or more Application Processors (AP) 810, a communication module 820, a Subscriber Identification Module (SIM) card 824, a memory 830, a sensor module 840, an input module 850, a display module 860, an interface 870, an audio module 880, a camera module 891, a power management module 895, a battery 896, an indicator 897, a motor 898, and/or the like.

The AP 810 may control one or more hardware or software components that are connected to AP 810, perform processing or computation of data (including multimedia data), and/or the like. As an example, the AP 810 may be implemented as a System-on-Chip (SoC). The AP 810 may include a Graphics Processing Unit (GPU) (not shown).

The communication module 820 (e.g., the communication interface 160) may transmit and receive data in communications between the electronic device 101 and other electronic devices (e.g., the electronic device 104, the server 106, and/or the like). As an example, the communication module 820 may include one or more of a cellular module 821, a Wi-Fi module 823, a Bluetooth module 825, a GPS module 827, a NFC module 828, a Radio Frequency (RF) module 829, and/or the like.

The cellular module 821 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 821 may differentiate and authorize electronic devices within a communication network using a Subscriber Identification Module (SIM) card (e.g., the SIM card 824). According to various embodiments of the present disclosure, the cellular module 821 may perform at least a part of the functionalities of the AP 810. For example, the cellular module 821 may perform at least a part of multimedia control functionality.

According to various embodiments of the present disclosure, the communication module 820 and/or the cellular module 821 may include a Communication Processor (CP). As an example, the cellular module 821 may be implemented as SoC.

Although FIG. 8 illustrates components such as the cellular module 821 (e.g., CP), the memory 830, the power management module 895 as components that are separate from the AP 810, according to various embodiments of the present disclosure, the AP 810 may include, or be integrated with, one or more of the foregoing components (e.g., the cellular module 821).

According to various embodiments of the present disclosure, the AP 810, the cellular module 821 (e.g., CP), and/or the like, may process instructions or data received from at least one of non-volatile memory or other components by loading in volatile memory. The AP 810, the cellular module 821, the communication module 820, and the like, may store at a non-volatile memory at least one of data that is received from at least one of other components or data that is generated by at least one of the other components.

Each of the Wi-Fi module 823, the Bluetooth module 825, the GPS module 827, the NFC module 828, and/or the like may, for example, include one or more processors that may process data received or transmitted by the respective modules. Although FIG. 8 illustrates the cellular module 821, the Wi-Fi module 823, the Bluetooth module 825, the GPS module 827, and the NFC module 828 as separate blocks, according to various embodiments of the present disclosure, any combination (e.g., two or more) of the cellular module 821, the Wi-Fi module 823, the Bluetooth module 825, the GPS module 827, the NFC module 828, and/or the like may be included in an Integrated Chip (IC) or an IC package. For example, at least some of the processors corresponding respectively to the cellular module 821, the Wi-Fi module 823, the Bluetooth module 825, the GPS module 827, the NFC module 828, and/or the like, may be implemented as a single SoC. For example, a CP corresponding to the cellular module 821 and a Wi-Fi processor corresponding to Wi-Fi module 823 may be implemented as a single SoC.

The RF module 829 may, for example, transmit and receive RF signals. Although not shown, the RF module 829 may include a transceiver, a Power Amplifier Module (PAM), a frequency filter, a Low Noise Amplifier (LNA), and/or the like. The RF module 834 may include one or more components for transmitting and receiving Electro-Magnetic (EM) waves (e.g., in free space or the like) such as, for example, conductors or conductive wires. Although FIG. 8 illustrates that the cellular module 821, the Wi-Fi module 823, the Bluetooth module 825, the GPS module 827, and the NFC module 828 are sharing one RF module 829, according to various embodiments of the present disclosure, at least one of the cellular module 821, the Wi-Fi module 823, the Bluetooth module 825, the GPS module 827, the NFC module 828, and the like may transmit and receive RF signals via a separate RF module.

The SIM card 824 may be a card implementing a SIM, and may be configured to be inserted into a slot disposed at a specified location of the electronic device. The SIM card 824 may include a unique identifier (e.g., Integrated Circuit Card IDentifier (ICCID)) subscriber information (e.g., International Mobile Subscriber Identity (IMSI)), and/or the like.

The memory 830 (e.g., memory 130) may include an internal memory 832, an external memory 834, or a combination thereof.

According to various embodiments of the present disclosure, the internal memory 832 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and the like.

According to various embodiments of the present disclosure, the internal memory 832 may be a Solid State Drive (SSD). As an example, the external memory 834 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 834 may be operatively coupled to the hardware 801 via various interfaces. According to various embodiments of the present disclosure, the hardware 801 may include recording devices (or recording media) such as, for example, Hard Disk Drives (HDD), and/or the like.

The sensor module 840 may measure physical/environmental properties detect operational states associated with the hardware 801, and/or the like, and convert the measured and/or detected information into signals such as, for example, electric signals or electromagnetic signals. As an example, the sensor module 840 may include at least one of a gesture sensor 840A, a gyro sensor 840B, an atmospheric pressure sensor 840C, a magnetic sensor 840D, an accelerometer 840E, a grip sensor 840F, a proximity sensor 840G, an RGB sensor 840H, a biometric sensor 840I, a temperature/humidity sensor 840J, a luminosity sensor 840K, a Ultra Violet (UV) sensor 840M, and the like. The sensor module 840 may detect the operation state of the electronic device and/or measure physical properties, and convert the detected or measured information into electrical signals. Additionally or alternatively, the sensor module 840 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 840 may also include control circuitry for controlling one or more sensors included therein.

The input module 850 may include a touch panel 852, a (digital) pen sensor 854, a key 856, an ultrasonic input device 858, and/or the like.

As an example, the touch panel 852 may detect touch input using capacitive, resistive, infrared, ultrasonic methods, and/or the like. The touch panel 852 may also include a touch panel controller (not shown). As an example, a capacitive-type touch panel may detect proximity inputs (e.g. hovering input) in addition to, or as an alternative to, physical touch inputs. The touch panel 852 may also include a tactile layer. According to various embodiments of the present disclosure, the touch panel 852 may provide haptic feedback to the user using the tactile layer.

As an example, the (digital) pen sensor 854 may be implemented using methods identical to or similar to receiving a touch input from a user, or using a separate detection sheet (e.g., a digitizer).

As an example, the key 856 may be a keypad, a touch key, and/or the like.

As an example, the ultrasonic input device 858 may be a device configured to identify data by detecting, using a microphone (e.g., microphone 888), ultrasonic signals generated by a device capable of generating the ultrasonic signal. The ultrasonic input device 858 may detect data wirelessly.

According to various embodiments of the present disclosure, the hardware 801 may receive user input from an external device (e.g., a network, computer or server) connected to the hardware 801 using the communication module 820.

The display module 860 (e.g., display 150) may include a panel 862, a hologram device 864, a projector 866, and/or the like. As an example, the panel 862 may be, for example, a Liquid-Crystal Display (LCD), an Active-Matrix Organic Light-Emitting Diode (AM-OLED) display, and/or the like. As an example, the panel 862 may be configured to be flexible, transparent, and/or wearable. The panel 862 and the touch panel 852 may be implemented as a single module. The hologram device 864 may provide a three-dimensional image. For example, the hologram device 864 may utilize the interference of light waves to provide a three-dimensional image in empty space. The projector 866 may provide image by projecting light on a surface (e.g., a wall, a screen, and/or the like). As an example, the surface may be positioned internal or external to the hardware 801. According to various embodiments of the present disclosure, the display module 860 may also include a control circuitry for controlling the panel 862, the hologram device 864, the projector 866, and/or the like.

The interface 870 may include, for example, one or more interfaces for a High-Definition Multimedia Interface (HDMI) 872, a Universal Serial Bus (USB) 874, a projector 876, or a D-subminiature (D-sub) 878, and/or the like. As an example, the interface 870 may be part of the communication module 820. Additionally or alternatively, the interface 870 may include, for example, one or more interfaces for Mobile High-definition Link (MHL), Secure Digital (SD)/MultiMedia Card (MMC), Infrared Data Association (IrDA), and/or the like.

The audio module 880 may encode/decode sound into an electrical signal, and vice versa. According to various embodiments of the present disclosure, at least a portion of audio module 880 may be part of the I/O interface 140. As an example, the audio module 880 may encode/decode voice information that is input into, or output from, the speaker 882, the receiver 884, the earphone 886, the microphone 888, and/or the like.

The camera module 891 may capture still images and/or video. According to various embodiments of the present disclosure, the camera module 891 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 895 may manage electrical power of the hardware 801. Although not shown, the power management module 895 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the hardware 801 may include wired or wireless charging. The charger IC may charge the battery 896, may prevent excessive voltage or excessive current from a charger from entering the hardware 801, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and the like. As an example, the wireless charger IC may include circuits such as a coil loop, a resonance circuit, a rectifier, and/or the like.

As an example, the battery gauge may measure a charge level, a voltage while charging, a temperature of the battery 896, and/or the like.

As an example, the battery 896 may supply power to the hardware 801. As an example, the battery 896 may be a rechargeable battery, a solar battery, and/or the like.

The indicator 897 may indicate one or more states (e.g., boot status, message status, charge status, and/or the like) of the hardware 801 or a portion thereof (e.g., AP 810). The motor 898 may convert an electrical signal into a mechanical vibration.

Although not shown, the hardware 801 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of receiving a communication, the method comprising:

detecting a selection of a phonetic function which requests or causes inclusion of at least one phonetic data file in the communication;

transmitting, by a first mobile device of the communication, in response to the selection of the phonetic function, a request for the at least one phonetic data file to a second mobile device of the communication; and receiving, in the communication, the requested one or more phonetic data file, wherein the phonetic data file comprises a phonetic alphabet system and an audio based phonetic pronunciation in accordance with the phonetic alphabet system of at least one character of an identifier designated by a transmitting entity, the identifier on which the audio based phonetic pronunciation is based being designated by a user of the transmitting entity.

2. The method of claim 1, wherein the detecting of the selection of a phonetic function occurs at one of device set-up, during a communication or after a communication.

3. The method of claim 1, wherein the phonetic data includes a phonetic transcription of at least one character of an identifier designated by a transmitting entity.

4. The method of claim 1, wherein the at least one character includes at least one of an alphabetic character, a numeric character and a special character.

5. The method of claim 1, wherein the at least one data file comprises a combined audio file which, when parsed, plays like an audio stream.

6. The method of claim 1, wherein the one or more data files including phonetic data are programmed by a user at one of a time of a device set-up, at a time prior to the transmission of the communication, at a time during the transmission of the communication and at a time after the transmission of the communication.

7. The method of claim 1, wherein the phonetic data includes data which conforms to the NATO phonetic alphabet or the International Phonetic Alphabet, including extensions and combinations thereof.

8. The method of claim 1, wherein the communication is one of a voice communication, a video communication, a video call communication and an electronic mail (e-mail) communication.

9. The method of claim 1, wherein the identifier designated by the transmitting entity is at least one of an identity, a home address, an e-mail address, and a phone number.

10. A method of transmitting a communication, the method comprising:

programming a mobile device with phonetic data;

creating one or more audio or image files including the phonetic data;

receiving, by the mobile device of the communication, a request for the one or more audio or image files including the phonetic data from a second mobile device of the communication; and transmitting, in a communication, the one or more audio or image files to be played or displayed upon reception of the communication in response to the received request, wherein the phonetic data comprises a phonetic alphabet system and an audio based phonetic pronunciation in accordance with the phonetic alphabet system of at least one character of an identifier designated by a transmitting entity, the identifier on which the audio based phonetic pronunciation is based being designated by a user of the transmitting entity.

11. The method of claim 10, further comprising:

detecting a selection of a phonetic function requesting inclusion of the phonetic data files in the communication, the detecting occurring at one of device set-up, during the communication or after the communication.

12. The method of claim 10, wherein the phonetic data includes a phonetic transcription of at least one character of an identifier designated by a transmitting entity.

13. The method of claim 10, wherein the at least one character includes at least one of an alphabetic character, a numeric character and a special character.

14. The method of claim 10, wherein the at least one data file comprises a combined audio file which, when parsed, plays like an audio stream.

15. The method of claim 10, wherein the one or more data files including phonetic data are programmed by a user at one of a time of a device set-up, at a time prior to the transmission of the communication, at a time during the transmission of the communication and at a time after the transmission of the communication.

16. The method of claim 10, wherein the phonetic data includes data which conforms to the NATO phonetic alphabet or the International Phonetic Alphabet, including extensions and combinations thereof.

17. The method of claim 10, wherein the identifier designated by the transmitting entity is at least one of an identity, a home address, an e-mail address, and a phone number.

18. The method of claim 10, wherein the at least one character designated by the transmitting entity is at least one character of an identity, of an e-mail address, or of a phone number.

19. A mobile device, comprising:

a transceiver;

a memory; and at least one processor communicatively coupled to the transceiver and the memory, the at least one processor configured to:

program the mobile device with phonetic data by storing the phonetic data in the memory, create one or more audio or image files including the phonetic data, receive, by the mobile device of the communication from a receiving mobile device of the communication, a request for the one or more audio or image files including the phonetic data from a second mobile device of the communication, and transmit, in a communication via the transceiver, the one or more audio or image files to be played or displayed upon reception of the communication in response to the received request, wherein the phonetic data comprises a phonetic alphabet system and an audio based phonetic pronunciation in accordance with the phonetic alphabet system of at least one character of an identifier designated by a transmitting entity, the identifier on which the audio based phonetic pronunciation is based being designated by a user of the transmitting entity.

20. A mobile device, comprising:

a transceiver;

a memory; and at least one processor communicatively coupled to the transceiver and the memory, the at least one processor configured to:

detect a selection of a phonetic function which requests or causes inclusion of at least one phonetic data file in the communication, transmit, by the mobile device of the communication, in response to the selection of the phonetic function, a request for the at least one phonetic data file to a second mobile device of the communication, and receive, in the communication via the transceiver, the requested one or more phonetic data file, wherein the phonetic data file comprises a phonetic alphabet system and an audio based phonetic pronunciation in accordance with the phonetic alphabet system of at least one character of an identifier designated by a transmitting entity, the identifier on which the audio based phonetic pronunciation is based being designated by a user of the transmitting entity.

* * * * *